US012693260B2

(12) United States Patent
BelBruno

(10) Patent No.: US 12,693,260 B2
(45) Date of Patent: Jul. 28, 2026

(54) ACETONE SENSOR AND ASSOCIATED METHODS

(71) Applicant: FreshAir Sensor, LLC, Lebanon, NH (US)

(72) Inventor: Joseph J. BelBruno, Hanover, NH (US)

(73) Assignee: FreshAir Sensor, LLC, Lebanon, NH (US)

( * ) Notice: Subject to any disclaimer, the term of this patent is extended or adjusted under 35 U.S.C. 154(b) by 199 days.

(21) Appl. No.: 18/237,760

(22) Filed: Aug. 24, 2023

(65) Prior Publication Data

US 2024/0068986 A1 Feb. 29, 2024

Related U.S. Application Data

(60) Provisional application No. 63/400,815, filed on Aug. 25, 2022.

(51) Int. Cl.
G01N 27/416 (2006.01)
(52) U.S. Cl.
CPC ................................ G01N 27/4162 (2013.01)
(58) Field of Classification Search
CPC ............. G01N 27/308; G01N 27/3271; G01N 27/3277; G01N 27/3272; G01N 27/3275; G01N 27/3276; G01N 27/4162; G01N 33/0031; G01N 33/004
See application file for complete search history.

(56) References Cited

PUBLICATIONS

Applied Surface Science 2014, 43-50 (Year: 2014).*
Iranian Polymer Journal, 2022, 31, 883-891 (Year: 2022).*

* cited by examiner

*Primary Examiner* — Gurpreet Kaur
(74) *Attorney, Agent, or Firm* — Cozen O'Connor

(57) ABSTRACT

An acetone sensor including a substrate, a pair of interdigitated electrodes disposed on the substrate, and a sensing film disposed on the pair of interdigitated electrodes and having electrical conductivity that depends upon a concentration of acetone. A method for detecting acetone includes for each sensor of a plurality of sensors: generating a signal if said sensor is exposed to a sample of acetone having density greater than or equal to an acetone detection threshold of said sensor, wherein the plurality of sensors has a respective plurality of acetone detection limits that span a detection range. A method for forming an acetone sensor includes dissolving a co-polymer and suspending conductive nanoparticles in an organic solvent to form a sensing solution, and coating the solution to form a conductive sensing film disposed on a pair of interdigitated electrodes disposed on a substrate.

16 Claims, 4 Drawing Sheets

300

310
PROVIDE A PLURALITY OF SENSORS COMPRISING A SUBSTRATE, A PAIR OF INTERDIGITATED ELECTRODES, AND A SENSING FILM

320
FOR EACH SENSOR OF THE PLURALITY OF SENSORS, GENERATE A SIGNAL WHEN SAID SENSOR IS EXPOSED TO A SAMPLE OF ACETONE HAVING GAS DENSITY GREATER THAN OR EQUAL TO AN ACETONE DETECTION THRESHOLD OF SAID SENSOR

ACETONE SENSOR AND ASSOCIATED METHODS

RELATED APPLICATION

This application claims priority to U.S. Provisional Patent Application No. 63/400,815, filed Aug. 25, 2022, the entirety of which is incorporated herein by reference.

BACKGROUND

The Center for Disease Controls and Prevention (CDC) reports that breathing moderate to high levels of acetone vapor short-term causes nose, throat, lung and eye irritation. In addition, headaches, light-headedness, confusion, nausea and vomiting have been reported. It has been reported that greater than 95% of acetone released during production enters the vapor phase. Other exposure occurs at the workplace. Long-term health effects in humans are unknown, but animal studies have found kidney and liver damage as well as an increase in birth defects as a result of acetone exposure.

The OSHA exposure limit is 1000 ppm over an eight-hour day. The NIOSH standard is stricter, the exposure limit is 250 ppm over a ten-hour day. In addition, an acetone sensor is invaluable in the application of breath diagnostics to the detection of diseases such as diabetes.

SUMMARY

The present disclosure provides devices, systems, and methods that allow for the detection of acetone vapors.

In one aspect, an acetone sensor includes a substrate, a pair of interdigitated electrodes disposed on the substrate, and a sensing film disposed atop the pair of interdigitated electrodes. The sensing film has electrical conductivity that depends upon the concentration of acetone vapor to which the sensing film is exposed. In another aspect, the electrical conductivity generated by the sensing film increases or decreases with increasing acetone concentration.

In another aspect, an acetone sensing system includes a plurality of sensors, each sensor having a sensing film with electrical conductivity that depends on the concentration of acetone vapor to which the sensing film is exposed.

In some embodiments, the sensing film comprises a molecularly imprinted polymer. In one aspect, the molecularly imprinted polymer film has a thickness between 10 nanometers and 10 micrometer, or between 100 nanometers and 1 micrometer, or between 500 nanometers and 1 micrometer.

In another aspect, the molecularly imprinted polymer is deposited on top of an electrically conductive polymer film. In another aspect, the electrically conductive polymer film comprises polyaniline or polypyrrole.

In some embodiments, the sensing film comprises a molecularly imprinted polymer and conductive nanoparticles. In one aspect, the conductive nanoparticles comprise gold, silver, carbon, or a combination thereof, selected to achieve a rate of electrical conductivity change with respect to acetone concentration.

In one aspect, the molecular imprinted polymer comprises a co-polymer comprising polymethacrylic acid and polymethacrylate. In another aspect, the molecular imprinted polymer comprises a co-polymer consisting essentially of polymethacrylic acid and polymethacrylate. In another aspect, the polymethacrylic acid and the polymethacrylate are present in the co-polymer at a concentration sufficient to achieve a rate of electrical conductivity change with respect to the concentration of acetone between 1 ppb and 1000 ppm, or between 10 ppb and 200 ppm, or between 100 ppb and 100 ppm.

In one aspect, the concentration of the polymethacrylic acid is between 1% and 30% by weight of the co-polymer, or between 1% and 15% by weight of the co-polymer.

In some embodiments, the substrate comprises glass, silicon, or a printed circuit board. In another aspect, the interdigitated electrodes comprise chromium, gold, or copper.

In some embodiments, the acetone sensing system further includes a control unit, wherein, for each sensor of the plurality of sensors, the control unit induces an electric current to flow through each sensor; and generates an acetone concentration measurement based on the electrical conductivity.

In another aspect, a method for detecting acetone includes, for each sensor of the plurality of sensors, generating a signal if said sensor is exposed to a sample of acetone having gas density greater than or equal to an acetone detection threshold of said sensor. The plurality of sensors has a respective plurality of acetone detection limits that span a detection range.

In another aspect, a method for forming an acetone sensor includes (i) dissolving a polymer and suspending a conductive nanoparticle in an organic solvent to form a mixture, and (ii) coating the mixture to form a sensing film disposed on a pair of interdigitated electrodes disposed on a substrate.

BRIEF DESCRIPTION OF THE DRAWINGS

The features and advantages of the present disclosure will become apparent from a consideration of the following detailed description presented in connection with the accompanying drawings in which.

DETAILED DESCRIPTION

Figure 1:
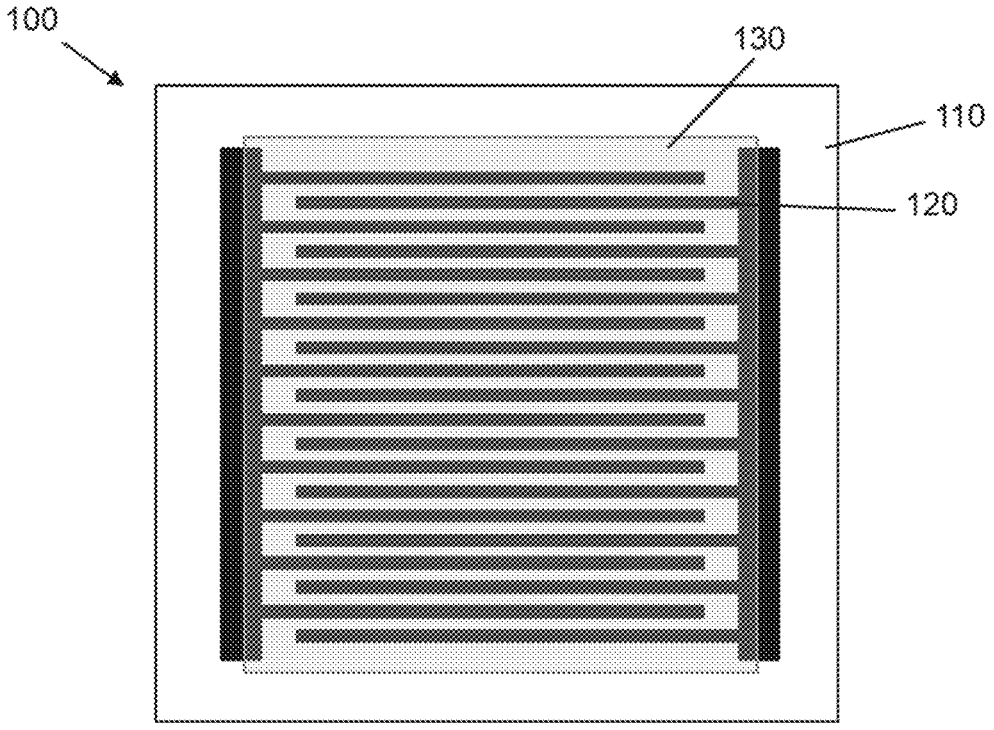
FIG. 1 shows an example of the acetone sensor with interdigitated electrodes deposited on a substrate and a sensing film disposed on the interdigitated electrodes.

FIG. 1 shows an acetone sensor 100 comprising a substrate 110, interdigitated electrodes 120 disposed on the substrate, and a sensing film 130 disposed on the interdigitated electrodes, according to an embodiment.

In some embodiments, the sensing film 130 exhibits an electrical conductivity that increases when exposed to increasing acetone concentration. Further, the electrical conductivity of the sensing film 130 decreases when exposed to decreasing acetone concentration. In some embodiments, the electrical conductivity of the sensing film 130 may decrease with increasing acetone concentration. Other dependencies of the electrical conductivity on the acetone concentration are included within the scope hereof.

The sensing film 130 may comprise a molecularly imprinted polymer. The molecularly imprinted polymer may comprise a co-polymer. Examples of materials used for the co-polymer include, but are not limited to, polymethacrylic acid and polymethacrylate. In an embodiment, a concentration of the polymethacrylic acid and the polymethacrylate is selected to achieve a rate of change of electrical conductivity with respect to the concentration of acetone between 10 ppb and 200 ppm. In some embodiments, the concentration of the polymethacrylic acid in the co-polymer is from about 1% to about 15% by weight (Joe is this by weight?). In some embodiments, the molecularly imprinted polymer film is deposited on top of an electrically conductive polymer film. Examples of the electrically conductive polymer film include, but are not limited to, polyaniline or polypyrrole.

In an embodiment, the sensing film 130 comprises a molecularly imprinted polymer and conductive nanoparticles. In an embodiment, the conductive nanoparticles may be between 10 nm to 500 nm in size. In another embodiment, the conductive nanoparticles may be between 50 nm to 300 nm in size, or between 100 nm and 200 nm in size. Examples of conductive nanoparticles include, but are not limited to, gold nanoparticles, carbon nanoparticles, silver nanoparticles, or a combination thereof. The conductive nanoparticles are selected to achieve a rate of change of the electrical conductivity with respect to acetone concentration.

The molecularly imprinted polymer may have a thickness between 100 nanometers and 1 micrometer. In other embodiments, the molecularly imprinted polymer may have a thickness of 100 nanometers, 150 nanometers, 200 nanometers, 250 nanometers, 300 nanometers, 350 nanometers, 400 nanometers, 450 nanometers, 500 nanometers, 550 nanometers, 600 nanometers, 650 nanometers, 700 nanometers, 750 nanometers, 800 nanometers, 850 nanometers, 900 nanometers, 950 nanometers, or 1 micrometer.

The acetone sensor 100 includes the substrate 110. Examples of substrate include, but are not limited to, glass, silicon, or a printed circuit board. The interdigitated electrodes 120 may comprise, for example, chromium, gold, or copper. The sensing film may have a thickness between 100 nanometers and 1 micrometer. In other embodiments, the sensing film 130 may have a thickness of 100 nanometers, 150 nanometers, 200 nanometers, 250 nanometers, 300 nanometers, 350 nanometers, 400 nanometers, 450 nanometers, 500 nanometers, 550 nanometers, 600 nanometers, 650 nanometers, 700 nanometers, 750 nanometers, 800 nanometers, 850 nanometers, 900 nanometers, 950 nanometers, or 1 micrometer.

Figure 2:
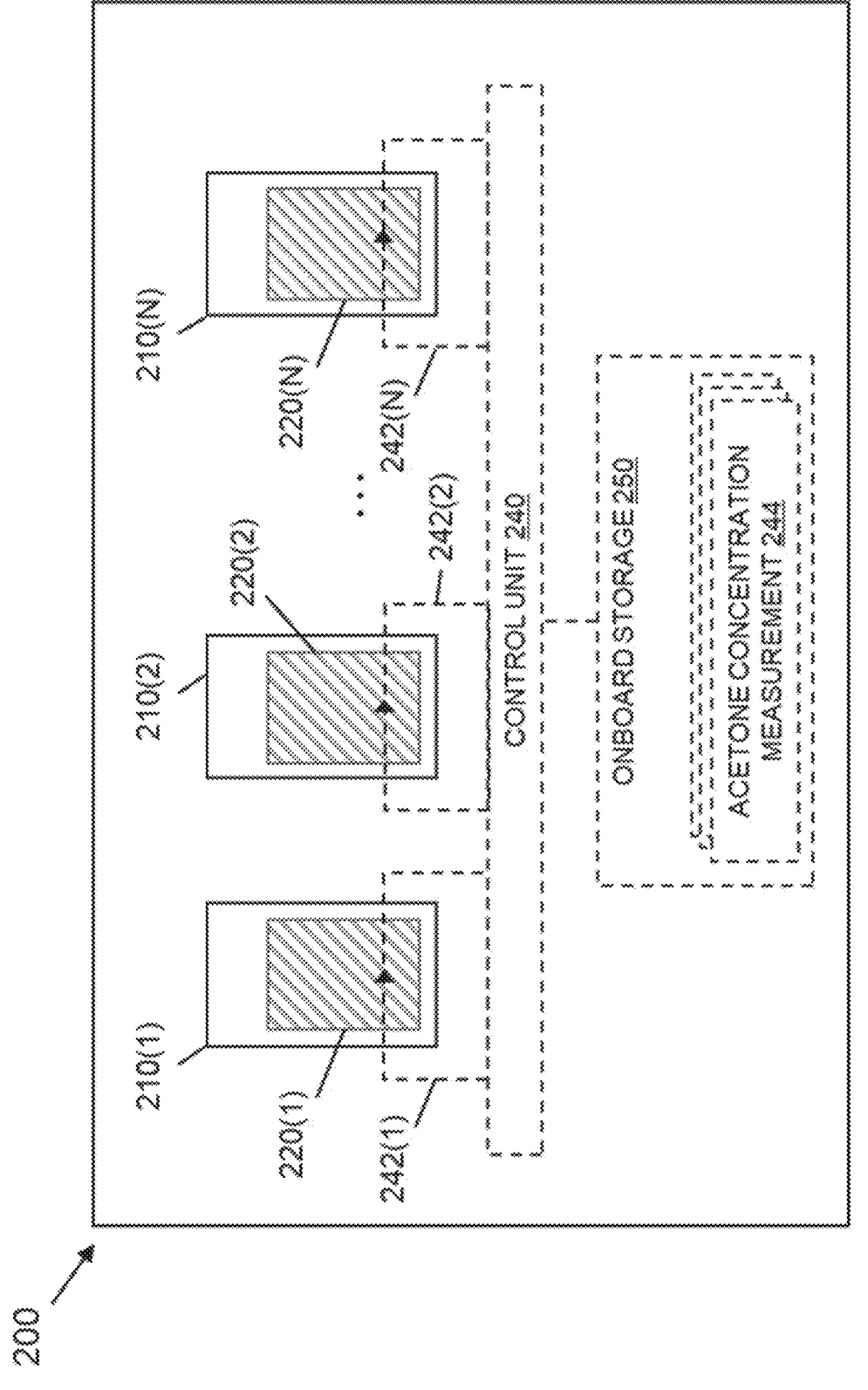
FIG. 2 shows an acetone sensing system that includes a plurality of sensors, each an example of FIG. 1, according to an embodiment.

FIG. 2 shows an acetone sensing system 200 that includes a plurality of sensors 210, each an example of the acetone sensor 100 of FIG. 1. The plurality of sensors 210 includes N sensors, labeled 210(1), 210(2), . . . 210(N) and each sensor includes a sensing film 220 having an electrical conductivity that depends on a concentration of acetone vapor in contact with the sensor 210. The sensors 210 and the sensing film 220 are respective examples of the acetone sensor 100 and sensing film 110 of FIG. 1, and the descriptions of each respective elements apply between the two figures. In an embodiment, the electrical conductivity increases with increasing concentration of acetone and decreases with decreasing concentration of acetone, though other dependencies are included within the scope hereof.

In an embodiment, the acetone sensing system 200 includes a control unit 240 that, for each sensor 210, induces an electrical current 242 to flow through the sensor 210 and generates an acetone concentration measurement 244 based at least in part on the electrical conductivity of the sensing film 220. In an embodiment, acetone concentration measurements 244 may be stored in an onboard storage 250 communicatively coupled to the control unit 240. In an embodiment, each sensor 210 is configured to have a different detection threshold. In such an embodiment, the acetone sensing system 200 includes a plurality of sensors

210 with a respective plurality of detection thresholds, such that each detection threshold corresponds to a different concentration of acetone (e.g., ≥10 ppb, ≥100 ppb, ≥1 ppm, ≥10 ppm, ≥25 ppm, ≥50 ppm, ≥100 ppm, and ≥250 ppm).

Figure 3:
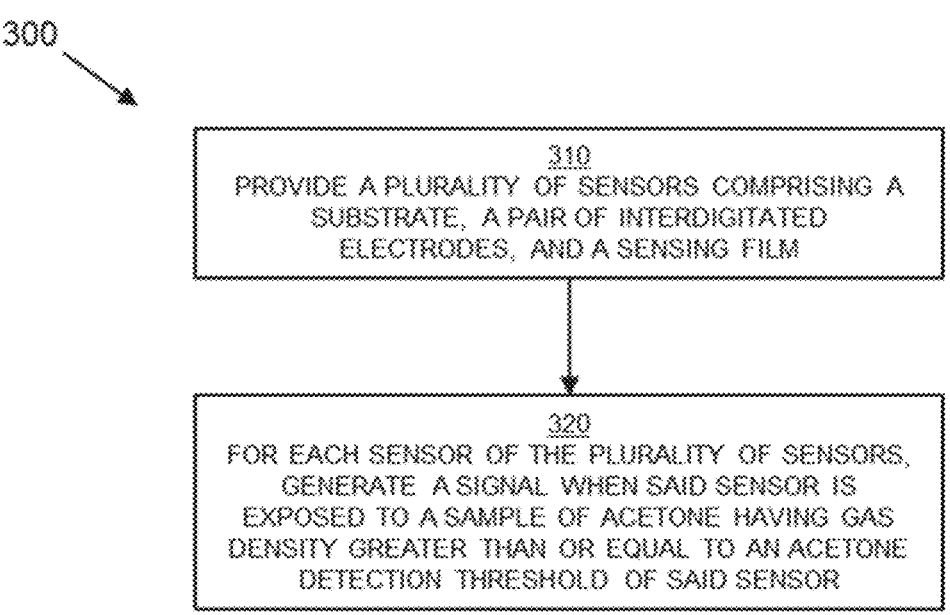
FIG. 3 is a flow chart illustrating a method for detecting acetone.

FIG. 3 is a flow chart illustrating a method 300 for detecting acetone. Method 300 may be used in conjunction with the acetone sensing system 200. Method 300 includes block 310, in which a plurality of sensors comprising a substrate, a pair of interdigitated electrodes, and a sensing film is provided. Method 300 further includes block 320, in which for each sensor of a plurality of sensors, a signal is generated if said sensor is exposed to a sample of acetone having gas density greater than or equal to an acetone detection threshold of said sensor, wherein the plurality of sensors has a respective plurality of acetone detection limits that span a detection range. In an embodiment, the acetone detection threshold is selected from the group consisting of 10 ppb, 100 ppb, 1 ppm, 10 ppm, 25 ppm, 50 ppm, 100 ppm, and 250 ppm acetone.

Figure 4:
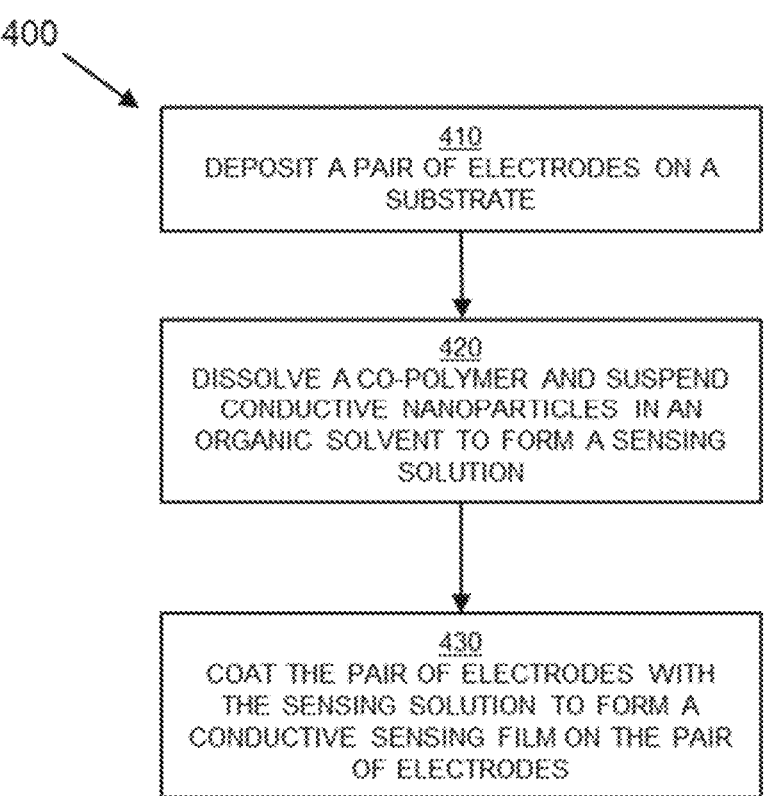
FIG. 4 is a flow chart illustrating a method for forming an acetone sensor.

FIG. 4 is a flow chart illustrating a method 400 for forming an acetone sensor. Method 400 may be used to form the acetone sensors 100 or 200. Method 400 includes blocks 410, 420, and 430.

In block 410, method 400 includes depositing a pair of electrodes on a substrate. The pair of electrodes may be a pair of interdigitated electrodes. In some embodiments, the pair of electrodes may be gold. In block 420, method 400 includes dissolving a co-polymer and suspending conductive nanoparticles in an organic solvent to form a sensing solution. A non-limiting example of the organic solvent may be chloroform, acetone, dichloromethane, or dimethylformamide (DMF). Non-limiting examples of the conductive nanoparticles include one or more of carbon nanoparticles, gold nanoparticles, and silver nanoparticles. In block 430, method 400 includes coating the pair of electrodes with the sensing solution to form a conductive sensing film on the pair of electrodes.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

EXAMPLES

The following is non-limiting examples of the present disclosure. It is to be understood that these examples are not intended to limit the present invention in any way. Equivalents or substitutes are within the scope of the present invention.

Example 1: Preparation of Imprinted Polymer Films by Evaporation

A molecularly imprinted polymer film, MIP, was produced in methylene chloride with the addition of 2%-10% acetone as the template. The control film, the NIP, was produced by following the same formation pathway as for MIP with methylene chloride except acetone was excluded from the mixture. The solid polymer was dissolved by magnetic stirring at a selected concentration (e.g., 2-20%, weight to volume). After complete dissolution, acetone was added, and the container was capped and stirring was continued for two hours to form the molecular complex. Films were prepared by dropping 125 μL of solution containing the molecular complex onto glass slides that had been cleaned with nitric acid, deionized water, and absolute ethanol. The substrate was placed on a spin coater and spun at 1000-3000 rpm for 30 sec to 1 minute, producing a film several hundred nanometers thick. The NIP and the MIP were compared using Fourier Transform Infrared-Attenuated Total Reflection (FTIR-ATR) spectra immediately after preparation. The host polymer bands are shifted relative to the pure NIP sample and, the acetone bands are detected in the MIP sample. In particular, analysis is focused on the C=O region near 1600 cm$^{-1}$.

Example 2: Synthetic Preparation of Imprinted Polymer Films

The MIP (and the NIP) are synthesized from the monomers that comprise the co-polymers used in Example 1. The MIP is created by dissolving 10 mg of functional monomer (the monomer that chemically or physically interacts with acetone) and 5 mg of acetone in 50 mL of ethanol (10% polymer and 5% acetone). A control suspension, the NIP, is prepared the same way except without the addition of acetone. Both suspensions are sonicated for four hours. The molar ratio of total functional monomer to template may vary from 2:1 to 6:1.

To make the imprinted polymer more robust, the addition of ethyleneglycol dimethacrylate (EGDMA), a crosslinking monomer, in a molar ratio of EGDMA to host polymer in the range from 2:1 to 6:1 is made with magnetic stirring. Films are formed by depositing 200 μL of this pre-polymerization mixture (either NIP or MIP) onto the electrodes and spinning at 5000 rpm for 30 sec followed by heating to 60° C. To remove any remaining acetone, the sensing film is soaked in 10 mL of ethanol for two hours and then allowed to dry. For "reinserted template" measurements, the film is exposed to acetone vapor in the test chamber for 10 minutes. The NIP and the MIP are compared using FTIR-ATR spectroscopy immediately after preparation. The host polymer bands are shifted relative to the pure NIP sample, and the acetone bands are detected in the MIP sample. In particular, analysis is focused on the C=O region near 1600 cm$^{-1}$.

Example 3: Preparation of Conductive MIP Films Using Nanoparticles

The MIP-nanoparticle composites, based on the procedures in Example 2, are initially created by suspending 20 mg of nanoparticles in a solution of 10 mg of functional monomer and 5 mg of acetone in 50 mL of ethanol (10% polymer and 5% acetone). A control suspension, the NIP, is made the same way except without acetone. Both suspensions are sonicated for four hours. The ratio of total functional monomer to template may vary from 2:1 to 6:1. To make the imprinted polymer more robust, the addition of ethyleneglycol dimethacrylate (EGDMA), a crosslinking monomer, in a ratio of EGDMA to host polymer in the range from 2:1 to 6:1 is made with magnetic stirring. Films are formed by depositing 200 μL of this pre-polymerization mixture (either NIP or MIP) onto the onto the electrodes using spin- or drop-coating, printing, plotting or any of the other modern deposition methods, and heating to 60° C. To remove any remaining acetone, the sensing film is soaked in 10 mL of ethanol for two hours and then allowed to dry.

For conductivity, measurements, the film is exposed to acetone vapor in the test chamber for 10 minutes. The NIP and the MIP (with and without acetone present) are compared using measurements performed by inserting the sensing films into a standard resistance measurement circuit.

Example 4: Preparation of Conductive MIP Films Using Conductive Polymers

A five percent (weight to volume) solution of the polypyrrole (PPy) polymer is created with magnetic stirring in chloroform, and 100 μL of this solution is coated onto the interdigitated electrodes, serving as the conductive reporting layer. The MIP solution is coated atop this first film using solutions as described in Example 2. The co-polymer is produced in methylene chloride solvent by magnetic stirring at a selected concentration (2-20%, weight to volume). After complete dissolution, the acetone template is added and stirring was continued for two hours to form the complex. Sensing films are prepared by depositing 125 μL of solution onto the electrodes that are previously coated with conductive polymer, producing a film several hundred nanometers thick. The control film, the NIP, is produced by following the procedure with methylene chloride and excluding acetone from the mixture. To remove any adsorbed acetone, creating the "template extracted" film, the sensing film is soaked in 10 mL of ethanol for two hours and then allowed to dry. For "reinserted template" conductivity measurements, the film is exposed to acetone vapor in the test chamber for 10 minutes. Conductivity measurements are performed by inserting the sensing films into a standard resistance measurement circuit.

The invention claimed is:

1. A sensor for detecting acetone, comprising:
   a substrate;
   a pair of interdigitated electrodes disposed on the substrate; and
   a sensing film disposed on the pair of interdigitated electrodes, wherein the sensing film comprises a molecularly imprinted polymer deposited on top of an electrically conductive polymer film, and the sensing film exhibits electrical conductivity that is dependent on concentration of acetone vapor to which said sensing film is exposed.

2. The sensor of claim 1, wherein the electrical conductivity increases with increasing acetone concentration.

3. The sensor of claim 1, wherein the molecularly imprinted polymer film has a thickness between 100 nanometers and 1 micrometer, or wherein the sensing film has a thickness between 100 nanometers and 1 micrometer.

4. The sensor of claim 1, wherein the molecular imprinted polymer comprises a co-polymer comprising polymethacrylic acid and polymethacrylate.

5. The sensor of claim 4, wherein the polymethacrylic acid and the polymethacrylate are present in the co-polymer at a concentration sufficient to achieve a rate of electrical conductivity change with respect to the concentration of acetone between 10 ppb and 200 ppm.

6. The sensor of claim 5, wherein the concentration of the polymethacrylic acid is between 1% and 15% by weight of the co-polymer.

7. The sensor of claim 1, wherein the electrically conductive polymer film comprises polyaniline or polypyrrole.

8. The sensor of claim 1, wherein the substrate comprises glass, silicon, or a printed circuit board.

9. An acetone sensing system, comprising:
   a plurality of sensors of claim 1.

10. The acetone sensing system of claim 9, further comprising a control unit, wherein for each sensor of the plurality of sensors the control unit:

induces an electric current to flow through each sensor; and generates an acetone concentration measurement based on the electrical conductivity.

11. The acetone sensing system of claim 9, wherein each sensor of the plurality of sensors comprises a sensor rate corresponding to a detection range of acetone concentrations comprising two or more of 10 ppb, 100 ppb, 1 ppm, 10 ppm, 25 ppm, 50 ppm, 100 ppm, and 250 ppm.

12. A method for detecting acetone comprising:

providing a plurality of sensors of claim 1,
    and for each sensor of the plurality of sensors, generating a signal when said sensor is exposed to a sample of acetone having gas density greater than or equal to an acetone detection threshold of said sensor;

wherein each sensor of the plurality of sensors has an acetone detection limit that spans a detection range.

13. The method of claim 12, wherein the acetone detection threshold is selected from the group consisting of 10 ppb, 100 ppb, 1 ppm, 10 ppm, 25 ppm, 50 ppm, 100 ppm, and 250 ppm acetone.

14. A method for forming the sensor of claim 1, comprising:

depositing a pair of electrodes on a substrate;

dissolving a co-polymer and suspending conductive nanoparticles in an organic solvent to form a sensing solution; and coating the pair of electrodes with the sensing solution to form a conductive sensing film on the pair of electrodes, thereby forming the sensor of claim 1.

15. The method of claim 14, wherein the pair of electrodes is a pair of interdigitated electrodes.

16. The method of claim 14, wherein the conductive nanoparticles comprise one or more of carbon, gold, and silver.

* * * * *